(12) United States Patent
Gold et al.

(10) Patent No.: US 8,650,372 B2
(45) Date of Patent: Feb. 11, 2014

(54) METHODS AND SYSTEMS FOR CALCULATING REQUIRED SCRATCH MEDIA (75) Inventors: Stephen Gold, Fort Collins, CO (US); Robert Gibson, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2491 days.

(21) Appl. No.: 10/684,001

(22) Filed: Oct. 10, 2003

(65) Prior Publication Data

US 2005/0081096 A1   Apr. 14, 2005

(51) Int. Cl.
*G06F 12/00* (2006.01)
*G06F 13/00* (2006.01)
*G06F 13/28* (2006.01)
*G06F 7/00* (2006.01)
*G06F 17/00* (2006.01)

(52) U.S. Cl.
USPC ............ 711/162; 711/161; 707/640; 707/661

(58) Field of Classification Search
USPC ................. 711/161, 162, 170, 171, 172, 173, 711/203–204; 707/203, 204
See application file for complete search history.

(56) References Cited

U.S. PATENT DOCUMENTS

| 5,416,914 | A | | 5/1995 | Korngiebel et al. |
| 5,506,986 | A | | 4/1996 | Healy |
| 5,664,146 | A | * | 9/1997 | Bolin et al. .................... 711/115 |
| 6,154,187 | A | * | 11/2000 | Kim ................................ 345/60 |
| 6,154,817 | A | | 11/2000 | Mohan et al. |
| 6,631,442 | B1 | * | 10/2003 | Blumenau ..................... 711/112 |
| 6,810,462 | B2 | * | 10/2004 | Matsunami et al. .......... 711/112 |
| 2002/0152181 | A1 | * | 10/2002 | Kanai et al. .................... 705/80 |
| 2004/0044862 | A1 | * | 3/2004 | Carlson et al. ................ 711/161 |

OTHER PUBLICATIONS

Vertices, "Vault Management", B&L Associates, Inc., Copyright 1998-2002, 5 pages, http://www.vertices.net/products/features_vault.htm.
"Media and Device Management Solutions", Legato Systems, Inc., 6 pages, http://www.legato.com/products/alphastor.
"Lagato Alphastor", Legato Systems, Inc., Copyright 2003, 5 pages, http://portal2.legato.com/products/alphastor/?mode=details.

* cited by examiner

*Primary Examiner* — Yaima Rigol (57) ABSTRACT

Methods and systems are disclosed for calculating required scratch media. In one embodiment, the method comprises obtaining backup job information from one or more backup applications for a plurality of backup jobs, calculating a required number of scratch media needed for one or more future executions of at least one of the backup jobs using the backup job information, and presenting the required number of scratch media to a user.

22 Claims, 5 Drawing Sheets

| DEVICE | NUMBER OF MEDIA |
|---|---|
| DEVICE_A | 70 |
| DEVICE_B | 140 |
| DEVICE_C | 10 |
| DEVICE_D | 12 |
| DEVICE_E | 14 |
| DEVICE_F | 60 |
| DEVICE_G | 5 |

*300*

310 → (DEVICE column) 320 → (NUMBER OF MEDIA column)

FIG. 3

| MEDIA POOL | NUMBER OF MEDIA |
|---|---|
| AB_LT01 | 150 |
| BC_DLT8 | 8 |
| DE_DLT8 | 10 |
| FG_DLT4 | 12 |
| GH_LT01 | 14 |
| IJ_DLT4 | 75 |

*400*

410 → (MEDIA POOL column) 420 → (NUMBER OF MEDIA column)

METHODS AND SYSTEMS FOR CALCULATING REQUIRED SCRATCH MEDIA

BACKGROUND OF THE INVENTION

Backup applications use scratch media to process backup jobs that backup data. Scratch media are either new media or media that contain data that can be overwritten. In order for the backup jobs to execute properly, scratch media of the appropriate type must be loaded into the backup devices, such as tape libraries, used by the backup applications.

Currently, a user must manually estimate how much scratch media are needed for future backup jobs. If the user does not correctly estimate how much scratch media are needed before the backup jobs run, the backup jobs halt while awaiting additional scratch media to be loaded. The backup job may fail if the media are not loaded within a predetermined time period.

The manual estimating process may be highly complex. Over a given time period, hundreds of backup jobs may execute using backup devices located in multiple data centers. Each backup job may be a full or incremental backup of clients with varying data sizes. Additionally, the estimating process is further complicated by the use of media pools by the backup applications. Each backup job may be associated with one or more media pools and may not be able to access scratch media in other media pools. Therefore, the user must not only ensure that each backup device has the appropriate amount of scratch media loaded but also must ensure that each media pool contains the appropriate amount of scratch media to execute the backup jobs using that media pool. Because the estimating process is so complex, backup jobs often fail because the appropriate amount of scratch media has not been loaded.

SUMMARY OF THE INVENTION

Methods and systems are disclosed for calculating required scratch media. In one embodiment, backup job information is obtained for a plurality of backup jobs. The backup job information is obtained from one or more backup applications and is used to calculate a required number of scratch media needed for one or more future executions of at least one of the backup jobs. The required number of scratch media is then presented to a user.

BRIEF DESCRIPTION OF THE DRAWINGS

Illustrative embodiments of the invention are illustrated in the drawings in which.

DETAILED DESCRIPTION

Figure 1:
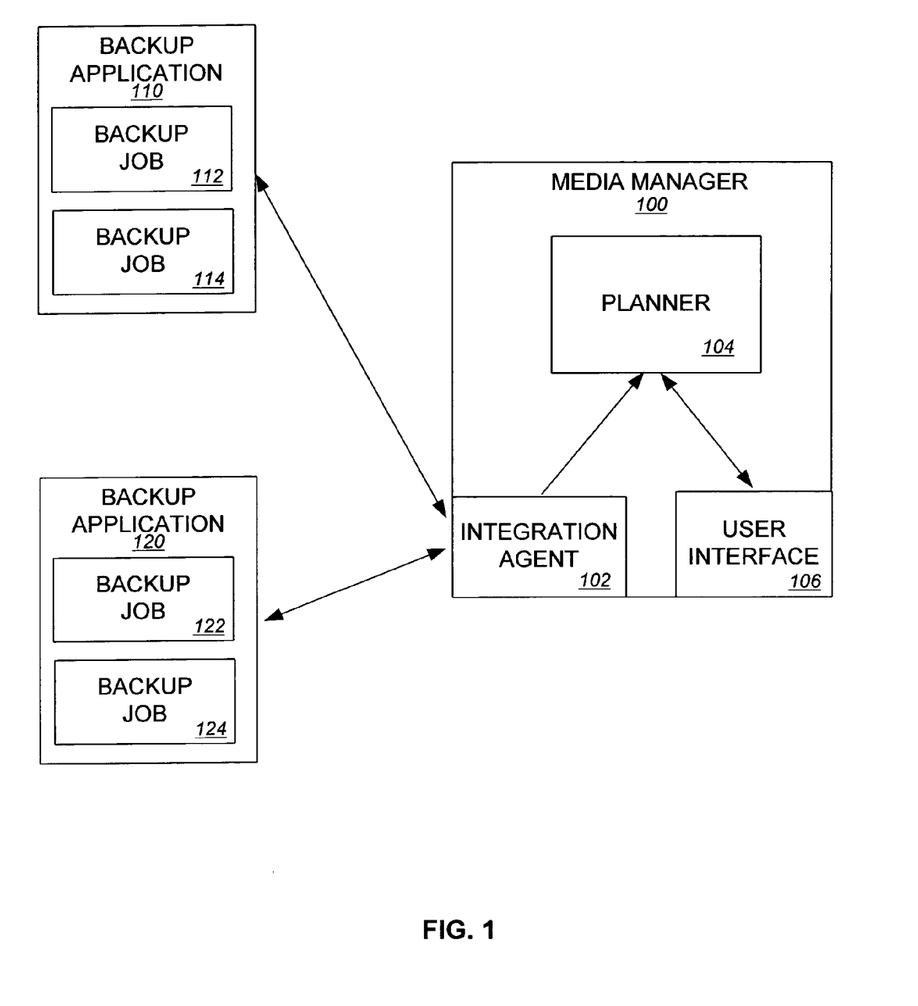
FIG. 1 illustrates an exemplary configuration of a media manager to manage scratch media for one or more backup applications.

An exemplary configuration using a media manager to manage scratch media is illustrated in FIG. 1. It should be understood that that the term media should not be regarded as being limited to two or more pieces of media, but could also include a single medium. The media manager 100 may be responsible for managing scratch media for multiple backup applications 110, 120. In one embodiment, backup application 110 may be Hewlett Packard Corporation's (a Delaware corporation having its principle place of business in Santa Clara, Calif.) Data Protector. Other backup applications may also be managed by media manager 100.

Backup application 110 is responsible for backup jobs 112, 114. Similarly, backup application 120 is responsible for backup jobs 122, 124. The backup jobs 112, 114, 122, 124 may each be full or incremental backups of data contained in various locations, such as on backup server(s) executing the backup applications 110, 120, one or more clients communicatively coupled to the backup servers, or other location (e.g., disk device) storing data to be backed up. It should be appreciated that in alternate embodiments, each backup application 110, 120 may be responsible for a larger number of backup jobs than that illustrated in FIG. 1. Additionally, media manager 100 may be responsible for managing the scratch media for a different number of backup applications 110, 120 than that shown.

Each backup application 110, 120 may be communicatively coupled to one or more backup devices (not shown) to backup the data associated with a backup job 112, 114, 122, 124. By way of example, backup devices may be standalone tape drives, robotic tape libraries, or optical disk libraries. The backup devices may each use scratch media to backup the data associated with the backup jobs 112, 114, 122, 124. Scratch media may be new media or previously written media that may now be overwritten. In one embodiment, the scratch media may be distributed into one or more media pools, each media pool associated with one or more of the backup jobs. Each of the media pools may contain media located in one backup device or multiple interconnected backup devices (e.g., interconnected tape libraries). In this embodiment, the backup jobs may only use scratch media contained in their associated media pools.

Backup applications 110, 120 are communicatively coupled to media manager 100. Media manager may obtain backup job information from backup applications 110, 120 for their respective backup jobs. By way of example, backup applications may be communicatively coupled to media manager via an internet or intranet and may send backup job information to the media manager using an open communication, such as XML (Extensible Markup Language). The backup job information may include devices and/or media pools used by the backup jobs, scratch media currently available in each of the backup devices and/or media pools, types of media used, compression rates, types of the backup jobs (e.g., full or incremental), locations of the data being backed up by the backup jobs, historical backup size information for the backup jobs, future scheduled executions of the backup jobs, and any other information that may be used to estimate the required number of media needed for future executions of the backup jobs.

Media manager 100 may include an integration agent 102 to request and/or receive the backup job information from the backup applications 110, 120. Additionally, media manager 100 includes planner 104 that uses the backup job information to calculate a required number of scratch media needed by the backup applications 110, 120 to execute one or more future backup jobs. Media manager may also include a user interface 106 to present the required number of scratch media to a user. The calculation of the required number of scratch media and the presentation to a user will be described in further detail below.

Media manager 100, integration agent 102, planner 104, and user interface 106 may be implemented in software, firmware, hardware, or a combination of these. Additionally, integration agent 102, planner 104, and user interface 106 may reside on separate physical locations, such as separate servers. By way of example, user interface 106 may be a web browser on a remote client.

It should be appreciated that configurations different than the one shown in FIG. 1 may be used in alternate embodiments. For example, integration agent 102 may additionally or alternately reside on one or more of the servers executing the backup applications managed by the media manager 100. This configuration may facilitate the exchange of information in configurations containing firewalls.

Figure 2:
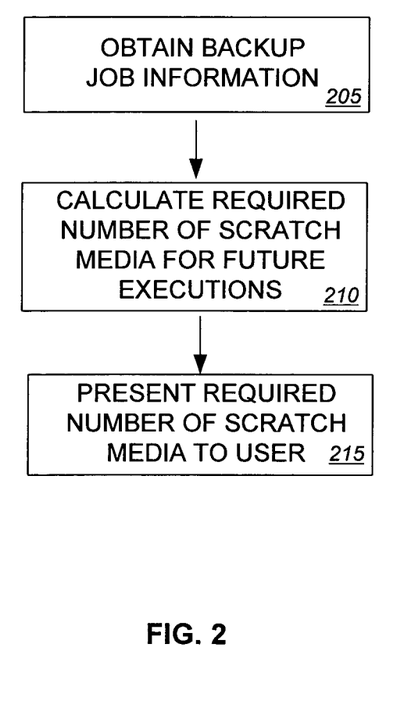
FIG. 2 is a flow diagram illustrating an exemplary method for managing scratch media that may be used by the media manager of FIG. 1.

FIG. 2 illustrates an exemplary method of managing scratch media that may be used by media manager 100. Backup job information is obtained 205 from one or more backup applications 110, 120 for a plurality of backup jobs 112, 114, 122, 124. As previously described, backup job information may include backup devices and/or media pools used by the backup jobs, scratch media available in each of the devices and/or media pools, types of media used, compression rates, types of the backup jobs (e.g., full or incremental), locations of the data being backed up by the backup jobs, historical backup size information for the backup jobs, future scheduled executions of the backup jobs, and other information that may be used to estimate a required number of scratch media needed for future executions of the backup jobs.

Next, the required number of scratch media needed for one or more future executions of at least one of the backup jobs is calculated 210 using the backup job information. Planner 104 may estimate the required number of scratch media required for the future executions of backup jobs scheduled within a predetermined period of time. It should be appreciated that the calculation may be performed in any manner that estimates the number of scratch media that will be required for future executions of one or more of the backup jobs.

In one embodiment, a user may divide the backup jobs into one or more subsets and may configure media manager 100 to perform the calculation 210 for one or more of these subsets at different intervals of time. By way of example, a user may configure media manager 100 to perform the calculation for subset A of the backup jobs on a daily basis and to perform the calculation for subset B of the backup jobs on Tuesdays and Thursdays. Backup jobs may be divided into subsets according to data center, importance of data being backed up, or other criteria determined by the user. The number of scratch media that the backup jobs in a subset is estimated to require may be calculated 210 for the time period before the next calculation for that subset is scheduled to be performed.

Figure 3:
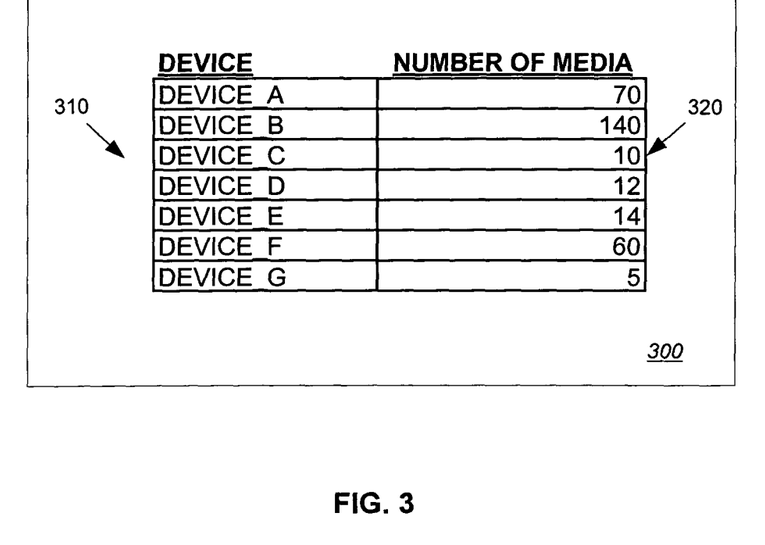
FIG. 3 illustrates an exemplary presentation to a user of a required number of scratch media.
Figure 4:
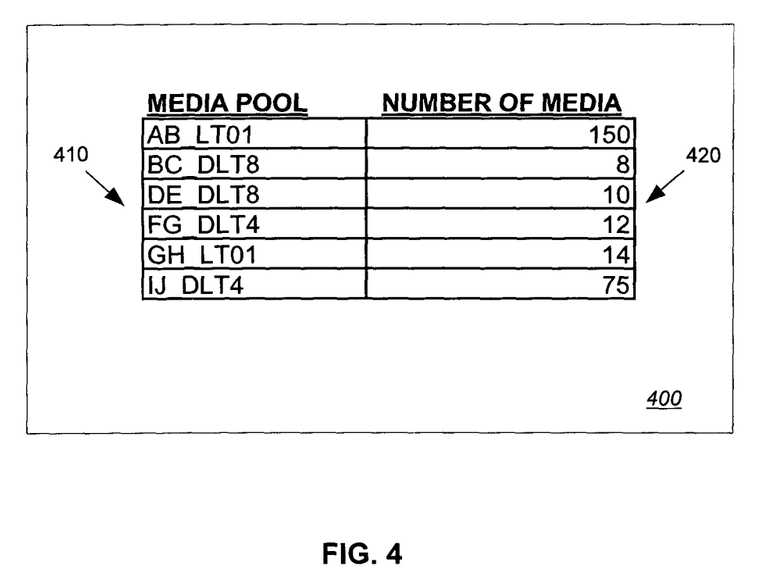
FIG. 4 illustrates a second exemplary presentation to a user of a required number of scratch media.

The calculated required number of scratch media is then presented 215 to a user. FIGS. 3 and 4 illustrate two exemplary embodiments used to present the information to a user. As shown in FIG. 3, user interface 106 may present the information to a user on a screen 300 containing a column 310 for each device used by the future executions of the backup jobs for which the calculation 210 was performed. A second column 320 may contain the required number of scratch media needed for each of the devices listed in column 310.

Alternately, or in addition to, the presentation illustrated in FIG. 3, the required number of scratch media may also be presented to the user for each media pool. Screen 400 contains a column 410 for each media pool used by the future executions of the backup jobs for which the calculation 210 was performed. The number of media required for each of the media pools is listed in column 420.

Figure 5:
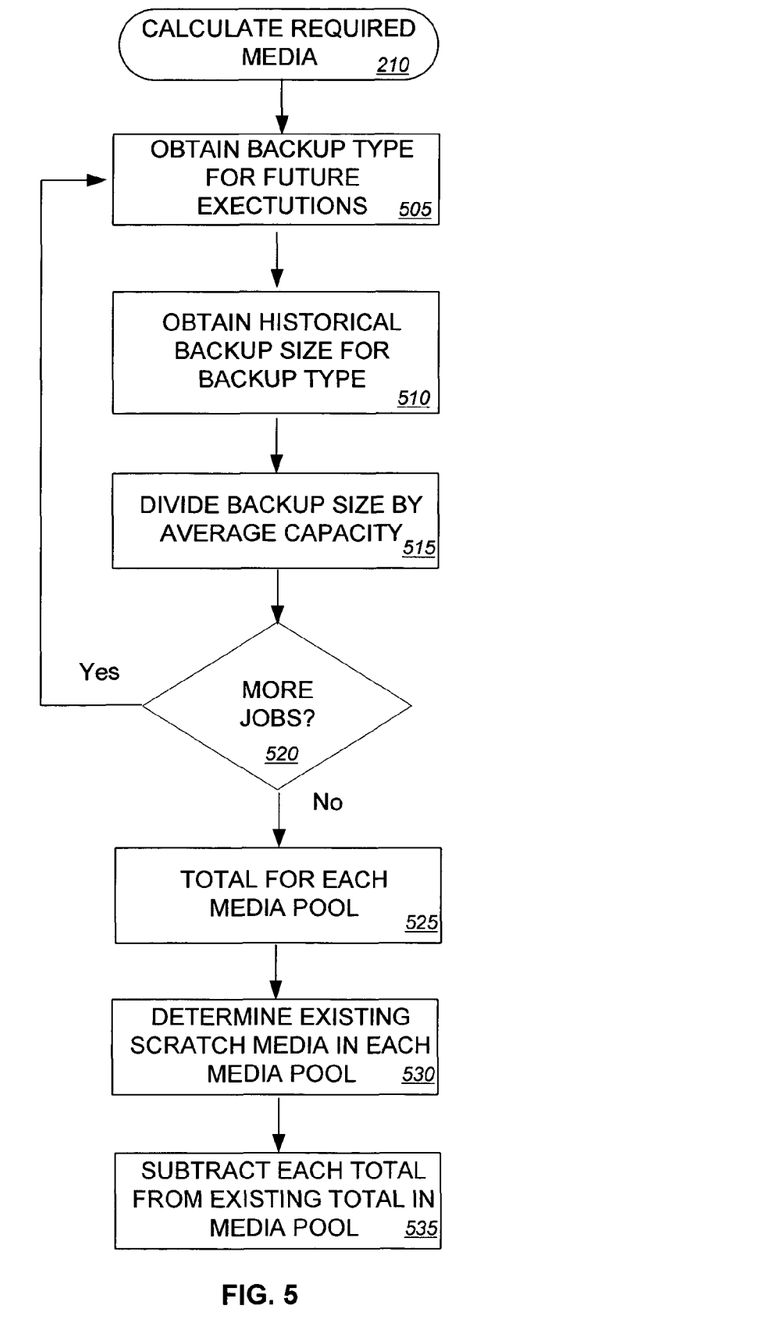
FIG. 5 is a flow diagram illustrating an exemplary method for calculating required scratch media that may be used by the method of FIG. 2.

It should be appreciated that the required number of scratch media may be presented to a user in a different manner than that illustrated in FIGS. 3 and 4. Additionally, in alternate embodiments, the user may be presented with other information that may facilitate the management of scratch media. By way of example, the user may be presented with a report identifying media pools having a greater amount of scratch media than the calculated 210 required scratch media. As a second example, the user may be presented with a report similar to that shown in FIG. 3 when the number of scratch media available in the pool becomes lower than a default value or a estimated number of media required based on historical usage of scratch media in the media pool FIG. 5 illustrates an exemplary method that may be used to calculate 210 the required number of scratch media needed for one or more future executions of at least one backup job. The method begins by obtaining 505, for a future execution of a backup job, the type of the backup job to be performed. By way of example, the backup type may be a full or incremental backup. In alternate embodiments, the backup type may not need to be obtained 505 as each backup job may be associated with a predetermined type of backup.

Next, an average historical backup size for the type of backup to be executed is obtained 510. The average historical size may be calculated by planner 104 by averaging backup sizes for previous executions of the backup job. Alternately, the average historical backup size may be included in the backup job information obtained from the backup application responsible for the backup job.

The number of media required for the future execution is then estimated at 515 by dividing the average historical backup size by the average capacity of the media type used by the backup job. In some embodiments (e.g., embodiments in which the media is defined as non-appendable), the required number of media may be rounded to the next or nearest whole number. In other embodiments (e.g., where the media may be appended), the required number of media may be rounded after totaling the number of media required for all backup jobs and subtracting from an available existing capacity (e.g., at 535). If the average backup size is not available, either because the backup job has not previously executed or other reason, a default number of scratch media, that may be based on the type of backup device and/or the type of backup job, may be used to estimate the required number of scratch media needed for the future execution of the backup job. Planner 104 may calculate the average capacity of the media type by obtaining, from the backup job information, the type of media used for the backup job and any compression information for the backup job or media pool used by the backup job. Alternately, the backup job information may include the average capacity of the media type used by the backup job.

If there are more future executions of additional backup jobs 520 which are included in the calculation 210, the method continues back at 505 to obtain the backup type for another future execution. It should be appreciated that if the calculation 210 includes multiple future executions of the same type of the same backup job, the number of media may be calculated for those executions by multiplying the number of executions by the amount obtained from 515.

If there are no more future executions of backup jobs to process 520, the method may continue by totaling 525 the number of media required for each media pool. The existing number of scratch media that will be available in each media pool is also determined 530. The existing number of scratch media available in each pool may be determined from information included in the backup job information.

Additional factors may be taken into account when determining the existing number of scratch media. By way of example, a determination may be made if a protected period for one or more existing data media in the media pool has expired, which may mean the data media may be overwritten and used as scratch media. A second factor that may be taken into account is the availability of appendable media (media that contains data that may be appended by a future execution of a backup job). The number of media required for each media pool may be totaled 525 for both non-appendable media (for backup jobs that may not append to existing media) and appendable media (for backup job that may append to existing media).

For each media pool, the total number required is subtracted 535 from the existing number of scratch media contained in the pool. In embodiments using appendable media, the existing capacity may also be subtracted from the total capacity required for appendable media. The remaining required capacity may then be divided by an average capacity of the media type to obtain a required number of appendable media. This total may then be combined with the estimated required total number of non-appendable media.

In an alternate embodiment, in addition or instead of 525-535, a total number of media may be calculated for the backup devices used by the future backup jobs. The existing number of scratch media available in the backup devices is also determined. The estimated total number of required media may then be subtracted from the existing total available in the backup device to obtain a number of media required for each backup device. When determining the number of existing scratch media available in the backup devices, appendable media may be taken into account as described above.

It should be appreciated that the order of the method depicted in FIG. 5 may be changed. For example, the determination of the number of existing scratch media 530 may be made prior to calculating the total media required for each media pool 525. Additionally, it should be appreciated that in alternate embodiments, an estimated number of media required for a media pool may be calculated and presented to a user in a different manner than that described with reference to FIGS. 2 and 5. For example, historical usage of scratch media in a media pool may be analyzed and the user may be prompted to initialize new scratch media for the media pool when the available number of scratch media becomes too low.

Figure 6:
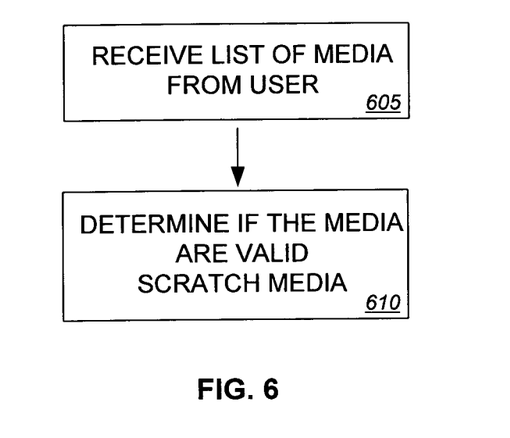
FIG. 6 is a flow diagram illustrating an exemplary method for confirming media to be used for the required scratch media.

FIG. 6 illustrates an exemplary method for confirming media to be used for the required scratch media that may be used by media manager 100. After presenting the required number of scratch media to a user 215, media manager 100 may receive 605 a list from the user of one or more media to be used for at least a portion of the required scratch media. For each media in the list, planner 104, or another component of media manager 100, may then determine 610 if the media that is intended to be used for the required scratch media is valid scratch media.

In order to determine if a media is valid scratch media, various factors may be taken into account. One factor that may be used is whether a protection date has expired for a previously written data media. Other factors such as the quality of the media (which may be determined from backup job information based on previous problems encountered by backup applications 110, 120 in using the media) or whether the media is included or initialized in the appropriate media pool may also be used to determine 610 if the media may be used to meet the scratch media requirements for the future executions of one or more backup jobs.

Figure 7:
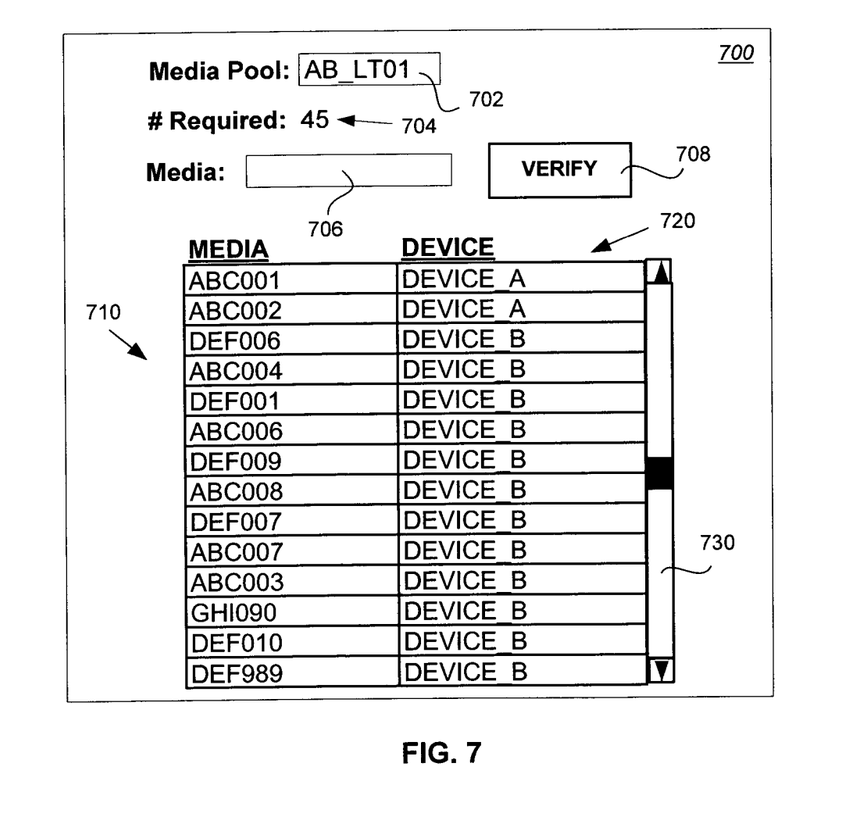
FIG. 7 illustrates an exemplary user interface that may be used to enter media to be used for the required scratch media.

A screen 700 that may provided by user interface 106 for the user to enter a list of one or more media to be used for the required scratch media is illustrated in FIG. 7. A text-entry area 702 is provided for the user to enter a media pool for which the media is to be entered. In alternate embodiments, the user interface may provide a list of media pools requiring scratch media from which the user may select, or the screen 700 may provide areas for the user to enter media for a backup device or combination of backup device and media pool.

A display area 704 displays the number of media required for the media pool. It should be appreciated that in alternate embodiments, screen 700 may not include display area 704 or may include additional or alternate display areas to display the number of media required for a selected backup device.

Screen 700 further includes a text entry area 706 to enter the media to be used for the scratch media for the device and/or media pool. The user interface 106 may receive this information, for example, from a keyboard or a barcode scanner used to scan barcodes located on the media. After the media is entered, a verify button 708 is provided to determine 610 if the media are valid scratch media. Alternately, the user may be prompted to verify or skip verification as each piece of media is entered.

A column 710 listing the media entered by the user may also be included in screen 700. The device for which the media is to be entered is listed in a second column 720. As the media list may be lengthy, scroll bar 730 may also be provided for the user to scroll through the list. In alternate embodiments, the second column 720 may display the media pool for which the media is to be entered or an additional column may be provided to display this information.

It should be appreciated that the methods described above may be performed by hardware components or may be embodied in sequences of machine-executable instructions, which may be used to cause a machine, such as a general-purpose or special-purpose processor or logic circuits programmed with the instructions to perform the actions set forth in FIGS. 2, 5, and 6. Alternatively, the methods may be performed by a combination of hardware and software.

What is claimed is:

1. A method comprising:
obtaining, by a processor, information regarding a future backup from one or more backup applications for a plurality of backup jobs, wherein the information corresponds to at least one of a backup device, a media pool used by a backup device, scratch media currently available in a backup device, scratch media currently available in a media pool, media type, compression rate, type of backup job, location of data being backed up, historical backup size, and future scheduled backup jobs;
determining, by the processor, a projected number of media for a future execution of at least one of the backup jobs using the information regarding the future backup, said projected number of media being sufficient to ensure a future backup does not fail due to lack of loaded media, said determining also comprising dividing an average historical backup size of the backup job by an average capacity of a media type associated with the backup job;
displaying the projected number of media to a user; and loading a sufficient quantity of media into a backup device or media pool to result in the projected number of media being loaded.

2. The method of claim 1, wherein obtaining the information regarding the future backup further comprises obtaining information for one or more backup devices, each backup device associated with at least one of the backup jobs.

3. The method of claim 2, wherein presenting the projected number of media comprises presenting the projected number of media for each of the backup devices.

4. The method of claim 1, wherein obtaining the information regarding the future backup further comprises obtaining information for one or more media pools, each media pool associated with at least one of the backup jobs.

5. The method of claim 4, wherein calculating comprises, for each media pool:
   determining an existing number of media in the media pool;
   calculating the projected number of media for the future execution using the media pool; and
   subtracting the existing number from the projected number.

6. The method of claim 5, wherein determining the existing number further comprises determining if a protected period for one or more existing data media has expired.

7. The method of claim 4, wherein presenting the projected number of media further comprises presenting the projected number of media for each of the media pools.

8. The method of claim 4, wherein calculating further comprises using the media pool information to analyze historical usage of the media pools.

9. The method of claim 4, further comprising presenting a report to the user identifying at least one media pool having a greater amount of media than the projected number of media for the at least one media pool.

10. The method of claim 1, further comprising:
    wherein obtaining the information regarding the future backup further comprises obtaining information for one or more media pools, each media pool associated with the backup jobs; and
    wherein calculating the projected number of media further comprises totaling the projected number of media for each media pool to be used by the future execution.

11. The method of claim 1, further comprising:
    wherein the obtaining the information regarding the future backup further comprises obtaining information for one or more backup devices associated with the backup jobs; and
    wherein calculating the projected number of media further comprises totaling the projected number of media for each backup device to be used by the future execution.

12. The method of claim 1, wherein calculating further comprises calculating the projected number of media for the future execution of the backup jobs scheduled within a predetermined period of time.

13. The method of claim 1, further comprising receiving from the user a list of one or more media to be used.

14. The method of claim 13, further comprising for each media in the list, determining if the media is a valid media.

15. A system comprising:
    a computer system configured to receive backup job information for a plurality of backup jobs from one or more backup applications, the backup job information includes an average historical backup size for one or more of the backup jobs;
    the computer system configured to determine a target number of media for a future execution of at least one of the backup jobs using the backup job information, the target number of media being sufficient to ensure a future backup does not fail due to lack of loaded media, the target number of media for the future execution determined by dividing the average historical backup size of the backup job by an average capacity of a media type associated with the backup job;
    a user interface configured to display the target number of media to a user; and
    a backup system coupled to said computer system, said backup system being loaded with a sufficient quantity of media to result in at least the target number of media being loaded.

16. The system of claim 15, wherein the backup job information comprises information for one or more backup devices, each backup device associated with at least one of the backup jobs and said user interface is further to present the number of media for each of the backup devices.

17. The system of claim 15, wherein the backup job information includes information for one or more media pools, each media pool associated with at least one of the backup jobs and said user interface is further to present the number of media for each of the media pools.

18. The system of claim 15, wherein said user interface is further configured to receive a list of one or more media to be used for at least a portion of the media.

19. The system of claim 18, wherein for each media in the list, said computer system configured to determine a number of media is further configured to determine whether the media is a valid media.

20. A non-transitory machine-readable storage medium having stored thereon sequences of instructions, which, when executed by a machine, cause the machine to:
    obtain backup job information from one or more backup applications for a plurality of backup jobs, wherein the backup job information corresponds to at least one of a backup device, a media pool used by a backup device, scratch media currently available in a backup device, scratch media currently available in a media pool, media type, compression rate, type of backup job, location of data being backed up, historical backup size, and future scheduled backup jobs;
    determine a proposed number of media for one or more future executions of at least one of the backup jobs using the backup job information, the proposed number of media being sufficient to ensure a future backup does not fail due to lack of loaded media; and
    display the proposed number of media to a user, wherein instructions for calculating the proposed number of scratch media comprise instructions, which, when executed by the machine, cause the machine to perform, for each backup job, divide an average historical backup size by an average capacity of a media type associated with the backup job; and
    verify that each media specified by a user to be loaded so as to result in the proposed number of media being loaded is a valid media.

21. The storage medium of claim 20, wherein when the machine presents the proposed number of media the instructions cause the machine to present the proposed number of media for one or more backup devices, each of the backup devices associated with at least one of the backup jobs.

22. The storage medium of claim 20, wherein when the machine presents the proposed number of scratch media the instructions cause the machine to present the proposed number of media for one or more media pools, each media pool associated with at least one of the backup jobs.

* * * * *